United States Patent [19]

Marlow et al.

[11] Patent Number: 4,883,538
[45] Date of Patent: Nov. 28, 1989

[54] COLORED THERMAL JOINT COMPOUND

[76] Inventors: Raymond Marlow, Rte. #6 Eastshore Rd., Rockwall, Tex. 75087; William M. Robertson, 209 Northwood, Lewisville; Edward J. Burke, 1700 Hearthstone, Plano, both of Tex. 75067

[21] Appl. No.: 231,372

[22] Filed: Aug. 8, 1988

[51] Int. Cl.$^4$ .................... C09K 3/00; C09C 1/02
[52] U.S. Cl. ......................... 106/287.13; 106/465
[58] Field of Search ............ 252/62, 573, 78.3, 309, 252/39; 106/287.13, 465; 524/425

[56] References Cited

U.S. PATENT DOCUMENTS

| | | | |
|---|---|---|---|
| 2,956,018 | 10/1960 | Carlyle et al. | 252/39 |
| 3,396,114 | 8/1968 | Vienna | 252/78.3 |
| 4,164,472 | 8/1979 | Cheng et al. | 252/39 |
| 4,193,769 | 3/1980 | Cheng et al. | 252/25 |
| 4,356,098 | 10/1982 | Chagnon | 252/49.6 |
| 4,370,359 | 1/1983 | Fetter et al. | 427/63 |
| 4,748,166 | 5/1988 | Gautier et al. | 524/452 |

OTHER PUBLICATIONS

Chem Abst. 65: 8640a and 8639h, BRAY Oil 1966.

*Primary Examiner*—Theodore Morris

[57] ABSTRACT

A colored thermal joint compound consists of a mixture of a thermal joint compound and a powdered coloring agent of proportions sufficient to form a colloidal solution. The thermal joint compound is, for example, a zinc oxide in either a silicone oil or mineral oil base, and the coloring agent is, for example, a colored calcium carbonate powder of colloidal size particles.

5 Claims, No Drawings

COLORED THERMAL JOINT COMPOUND

This invention relates to a new composition of matter and more particularly to an improved thermal joint compound.

BACKGROUND OF THE INVENTION

Thermal joint compounds are used to improve the transfer of thermal energy by filling the minute air gaps between metal-to-metal surfaces, such as exist between the thermoelectric elements and heat exchangers of thermoelectric heat pumps. Existing thermal joint compounds have a white, greasy appearance. The material because of its greasy characteristic is difficult to handle without soiling the user's clothes, uncovered portions of the user's body, and the user's work station. Owing to the white color, these soiled areas are made very conspicuous. In addition the white color can detract from the desired cosmetics of the end product, thereby tending to limit the commercial applications for thermoelectric coolers.

This color related problem with existing thermal joint compounds has been recognized and at least one attempt to solving the problem has been made as evidenced by an existing product on the market containing a coloring ingredient.

A disadvantage attending the use of the existing colored product is that with the passage of time the coloring agent separates from the compound as a liquid. This color separation fades the color of the compound to an off shade of white as well as freeing the liquid coloring for soiling anything or anybody coming in contact with it.

A principal difference between the colored thermal joint compound and the prior art compound is that separation of the coloring agent from the thermal joint compound is substantially eliminated. Thus, after a storage period a remixing process is not required immediately prior to use, and the cosmetic effect achieved with its use does not deteriorate with time owing to color separation with time.

A principal reason in the coloring of the thermal compound is to relate visually to the temperatures of the TE cooling system (i.e. blue for cool; red for hot temperatures) for assembly purposes, and for marketing the products.

SUMMARY OF THE INVENTION

Accordingly the object of the present invention is to provide a colored thermal joint compound whose color is substantially permanent.

Briefly stated the colored thermal joint compound constituting the subject matter of this invention is a colloidal dispersion formed by a mixture of a thermal joint compound and colored particles. By "colloidal dispersion" or "colloidal solution", applicant means the mixture of two substances the particles of which are so finely divided that they do not settle and cannot be filtered by ordinary means. The kinds of colloidal solutions include a solid dispersed in a liquid and a solid dispersed in a solid or semi-solid.

Other objects and features of the invention will become more readily understood from the following detailed description of the invention.

DESCRIPTION OF A PREFERRED EMBODIMENT

The new composition of matter constituting the invention is a colored thermal joint compound consisting of a colloidal solution having colloidal dispersion of colored particles as the colloidal particles, i.e., substances dispersed in particles much larger than molecules in a thermal joint compound as the carrier (solvent) at a ratio of 1 part colored particles to 25 parts thermal joint compound. Suitable thermal joint compounds are, for example, a thermal joint compound sold under the trademark THERMALCOTE by Thermalloy, Inc. and a thermal joint compound sold under the trademark TYPE 120 THERMAL COMPOUND by EG&G Wakefield Engineering.

THERMALCOTE has a typical propeties as follows:

| | |
|---|---|
| Color | Opaque White |
| Working Temperature | −40 to +400 deg. F. |
| Maximum Temperature | 800 deg. F. |
| Thermal Conductivity | 0.430 Btu/(ft) (hr) (F. deg.) |
| | 0.00745 watts/(Cm) (C. deg) |
| | 0.0189 watts/ (in) (C. deg) |
| Dielectric Strength (0.50 gap) | 300 volts/mil |
| Volume Resistivity | 4 × 10 to the 14th ohm-cm |
| Solvent | Trichlorethylene |
| Specific Gravity | 1.6 |

TYPE 120 THERMAL COMPOUND (zinc oxide in a silicone oil carrier) or Type 121 (mineral oil carrier) have properties as follows:

| | |
|---|---|
| Volume Resistivity | 5 × 10 to the 14th ohm/cm |
| Dielectric Strength | 225 volts/mil |
| Specific Gravity | 2.1 |
| Thermal Conductivity | .735 W/(m) (K) |
| | 5.1 (BTU) (in)/(HR) (sq ft) (deg. F.) |
| Thermal Resistivity (P) | 56 (deg C.) (IN)/WATT |
| Bleed, % after 24 hrs @ 200 deg C. | 0.5 |
| Evaporation % after 24 hrs @ 200 deg C. | 0.5 |
| Color | Opaque White |

A suitable coloring agent is CHALK 47-403 or Chalk 47-404 manufactured by the Stanley Works, New Britain, Ct.

The Chalk 47-403 is a finely ground (colloidal size) calcium carbonate powder colored blue and suitable for use at temperatures between zero degrees and 100 degrees Celsius. While Chalk 47-404 is a finely (micron size) ground calcium carbonate powder colored red and suitable for use at temperatures up to 300 degrees Celsius.

EXAMPLE

The colored thermal joint compound was prepared using 50 Mg of W-120-320 Thermal Compound manufactured by Wakefield Engineering and 2 Mg of a blue CHALK 47-403 manufactured by Stanley Works, Inc. The blue chalk was added to the thermal joint compound in a mixer container and beat with an electric mixer for about 5 minutes or until the chalk was completely and uniformly dispersed throughout the thermal compound. The compound was packaged and has been observed after eighteen months storage without evidence of settling or separation.

Although a single embodiment of the invention and method of preparation has been described, it will be apparent to a person skilled in the art that various modifications can be made to the invention without departing from the scope of this invention.

What is claimed is:

1. A colored thermal joint compound comprising:
   a heat conductive compound as carrier comprising silicone oil and a colored chalk as colloidal particles, each particle of the colored chalk having a size and preselected color for forming colloidal particles for the heat conductive compound, said colored chalk being mixed with the heat conductive compound in a quantity sufficient to form a colloidal dispersion suitable for use as a preselected thermal joint compound.

2. A colored thermal joint compound according to claim 1 wherein the mixture ratio of thermal joint compound to colored chalk is about 25:1.

3. A colored thermal joint compond according to claim 2 wherein the colored chalk comprises a colored calcium carbonate powder.

4. A colored thermal joint compound according to claim 3 wherein the color of the colored calcium carbonate powder is selected from a group of colors consisting of blue and red for use as a visual aid.

5. A colored thermal joint compound according to claim 1 wherein the thermal joint compound further includes zinc oxide.

* * * * *